United States Patent [19]

Ochi

[11] Patent Number: 5,315,911
[45] Date of Patent: May 31, 1994

[54] MUSIC SCORE DISPLAY DEVICE

[75] Inventor: Mitsunori Ochi, Hamamatsu, Japan

[73] Assignee: Yamaha Corporation, Hamamatsu, Japan

[21] Appl. No.: 919,305

[22] Filed: Jul. 24, 1992

[30] Foreign Application Priority Data

Jul. 24, 1991 [JP] Japan .................... 3-184546

[51] Int. Cl.⁵ ............................. G09B 15/02
[52] U.S. Cl. ................................. 84/477 R
[58] Field of Search .............. 84/477 R, 478, 470 R, 84/465, 467, 609, 615, 644

[56] References Cited

U.S. PATENT DOCUMENTS

| | | | |
|---|---|---|---|
| 4,484,507 | 11/1984 | Nakada et al. | 84/478 |
| 4,976,182 | 12/1990 | Obuchi et al. | 84/470 R |
| 5,069,104 | 12/1991 | Shibukawa | 84/609 |
| 5,153,829 | 10/1992 | Furuya et al. | 84/477 R X |

FOREIGN PATENT DOCUMENTS 1277893 11/1989
62-54292 3/1987 Japan .
1188900 7/1989 Japan .

Primary Examiner—Stanley J. Witkowski
Attorney, Agent, or Firm—Spensley Horn Jubas & Lubitz

[57] ABSTRACT

A music score display device has a storage device for storing music score data, a display device for displaying the music score data for each specified section, and a comparator for comparing the musical playing data supplied from a player with the music score data. The music score display device further has a retrieval device for retrieving a playing position according to the compared result of the comparator, and a display controller for controlling display section of the display device based on the retrieval result of the retrieval device.

13 Claims, 5 Drawing Sheets 76,75,76,72,74,72,69,60,64,69,71
| | | | | | | | | |
76,75,76,71,74,72,69,60,64,69,71

MUSIC SCORE DISPLAY DEVICE

BACKGROUND OF THE INVENTION

1. Related Art

The present invention relates to a display device such as Liquid Crystal Display device, particularly to a musical score display device for successively and automatically displaying a musical score according to a progress of musical playing.

2. Description of the Related Art

Generally, a player plays a musical instrument with a musical score. However, since general instruments need the player's both hands to be played, the playing may be interrupted when the score is turned over to the next page. To avoid that situation, another person is required to turn over the page.

A device is proposed to resolve such problems. That is, the device is equipped with a personal computer having a display in which musical score data is inputted in advance and the data is displayed successively according to a progress of the real playing.

The above mentioned device can follow the actual played music only when the coincident playing with the score is performed. Therefore, if the player makes a mistake of playing or skips the score, the corresponding part of the score isn't displayed in the display.

SUMMARY OF THE INVENTION

It is therefore an object of the present invention to provide a music score display device having a trace function of the music score.

It is another object of the present invention to provide a music score display device that is capable of displaying always correct music score according to the actual playing.

In accordance with the present invention, a music score display device comprises storage means for storing music score data, display means for displaying the music score data for each specified section, input means for inputting musical playing data including at least tone pitch data, comparison means for comparing the musical playing data inputted from the input means with the music score data, retrieval means for retrieving a playing position according to the compared result of the comparison means, and display control means for controlling display section of the display means based on the retrieval result of the retrieval means.

According to the above arrangement, the display means displays the music score data for each section, the comparison means compares the inputted musical playing data with the music score data, and the retrieval means retrieves a playing position to be displayed. If the inputted musical playing data, i.e., which is generated by player's presently playing, accords with the presently displayed music score data, the music score displaying is controlled without a skip of the music score displaying, and if the inputted musical playing data doesn't accord with the presently displayed music score data, the retrieval is performed around the discord part. This arrangement allows the display contents to trace appropriately the actual playing even if the miss playing or the skip playing occurs.

BRIEF DESCRIPTION OF THE DRAWINGS

FIGS. 4 (A), (B) show a comparison manner of the musical playing data and the music score data.

DETAILED DESCRIPTION OF THE PREFERRED EMBODIMENT

Figure 1:
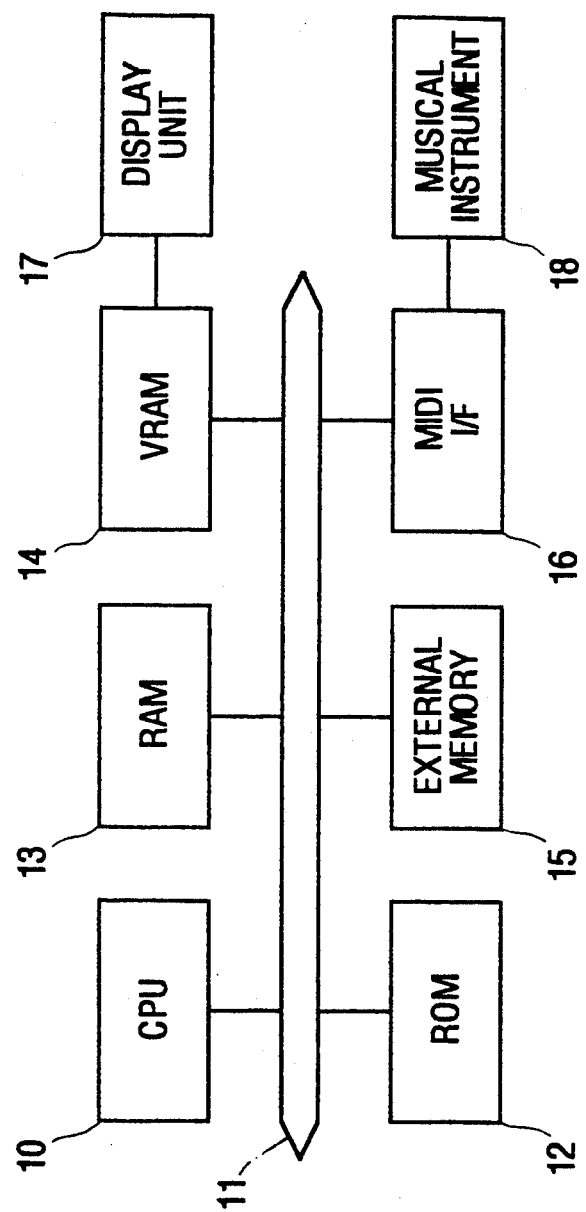
FIG. 1 is a block diagram of a music score display device embodying the present invention.

FIG. 1 is a block diagram of a music score display device embodied the present invention. Musical score data is stored in an external memory 15. The external memory 15 can be organized with a floppy disc, a ROM card or the like. In such storage medium, whole data to be written in a musical score that a player wants to play is stored. The whole data includes tone pitch data, length data, and tone generation timing data of each note and tempo mark data, dynamic mark data, and expression mark data (for example, staccato mark data and legato mark data). The tone pitch data can be read out of these data. The external memory 15 is connected to a bus 11 through an interface (slot). To the bus 11, a CPU 10 for controlling a process of the music score display device, a ROM 12, a RAM 13, a VRAM 14 and a MIDI interface 16 are connected. A program for controlling the music score display device is stored in the ROM 12. The program includes a program that is capable of inferring whether discordance of the display content and the real playing content is caused by a player's miss-touch (a mistake of playing) or by that the player plays a different place from the score place. The VRAM 14 stores bit-map data of the music score data of a specified section read from the external memory 15. The storage data in the VRAM 14 is displayed in a display unit 17. The display unit 17 is provided with an LCD matrix display device 20 which serves for displaying the contents of the VRAM 14 thereon. The LCD display device 20 is arranged in front of a player. The player can play, looking at the score on the display. An electronic or natural musical instrument 18 is connected to the MIDI interface 16. It is required for the instrument that it can change the played musical tone data to MIDI tone pitch data and input the data to the MIDI interface 16. With the natural instrument, frequencies of the generated musical tone are detected, and the frequencies are changed to tone pitch data. The playing data (tone pitch data) inputted from the MIDI interface 16 is accumulatively stored in a buffer provided in the RAM 13.

Figure 2:
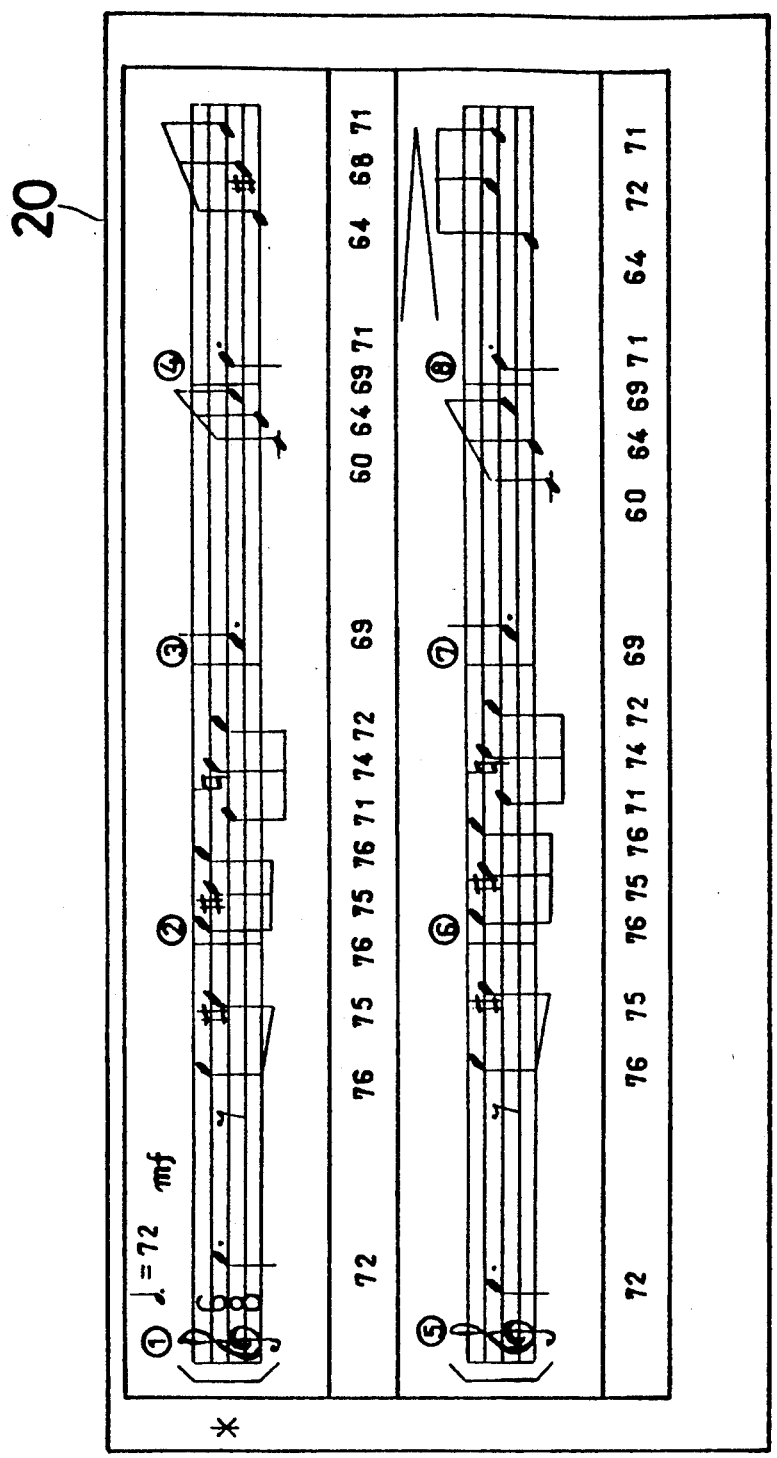
FIGS. 2 (A), (B) show examples of a music score displayed on an LCD display unit.
Figure 2:
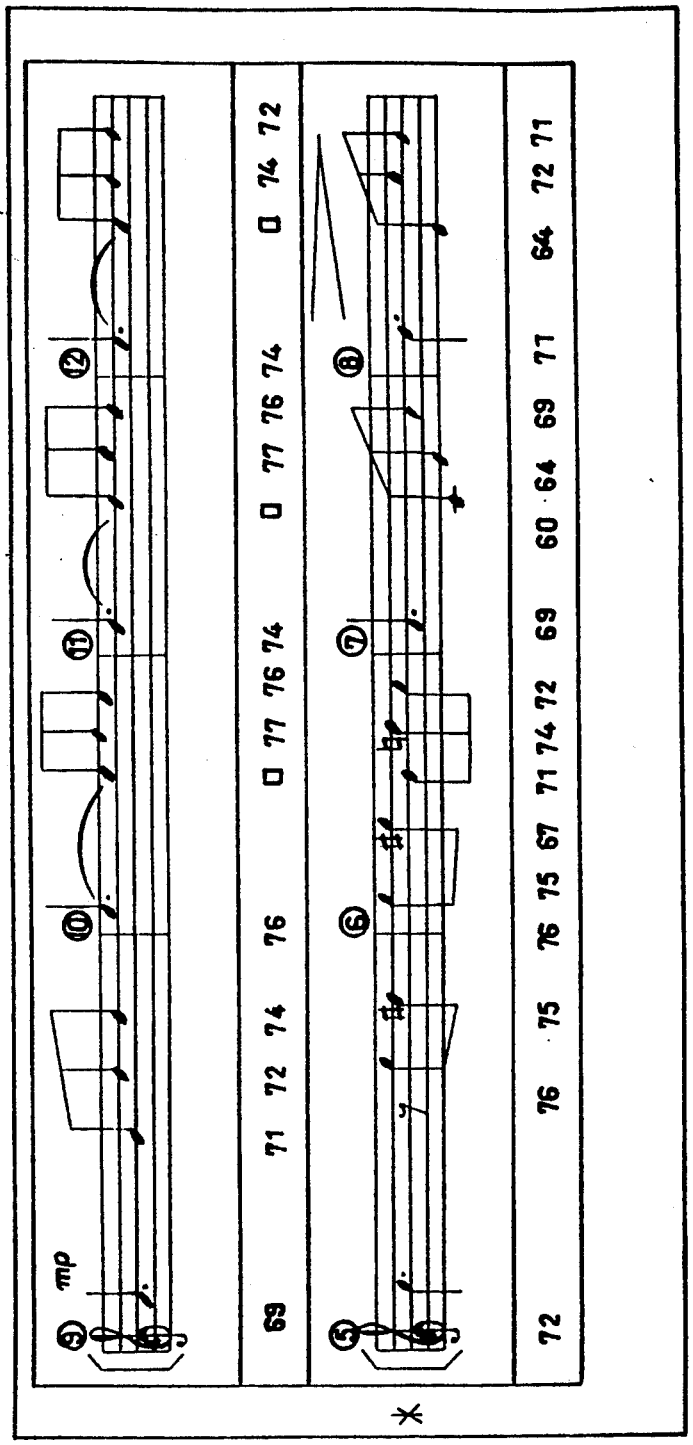

FIGS. 2 (A), (B) show examples of a music score displayed on the LCD display unit 20. This display unit can display two steps of a score. When playing of either step is finished, a new score is displayed on the step area. Namely, in FIG. (A), bars from the first bar to the forth bar are displayed at the first step area, bars from the fifth bar to the eighth bar are displayed at the second step area. While, in FIG. (B), though the second step area displays the fifth to eighth bars at the second step area, the ninth to twelfth bars are displayed at the first step area. The mark "*" displayed at the left side of the display unit is a pointer representing which step area is activated for playing. The numeral line displayed at the bottom of each score represents key numbers (tone pitch data). These key numbers are used for deciding accord or discord of the actual playing data and the score data, but, note length data is not used for deciding that. That's why a tempo to be played is not constant so that it is difficult to detect the note length data. The display device can be arranged so as not to display the key numbers.

Figure 3:
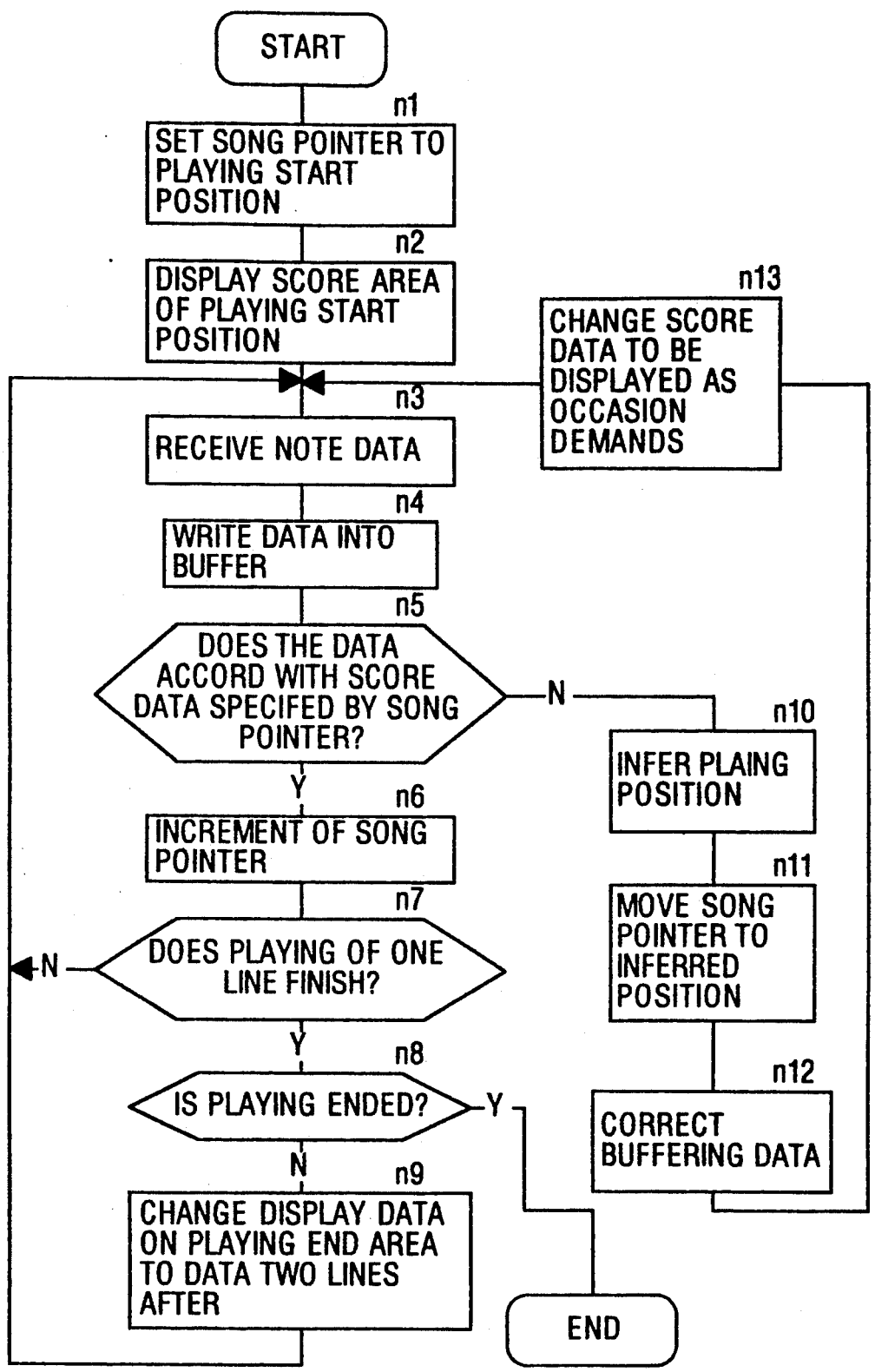
FIG. 3 is a flowchart showing a process of the music score display device.

FIG. 3 is a flowchart showing a process of the music score display device. The process starts when the external memory 15 in which the score data is stored is inserted into a slot. First, a song pointer is set at the beginning position of playing (n1). The song pointer is a pointer for specifying a playing position on the score, a player being able to set it with a bar number at the beginning of playing. If the player doesn't set the song pointer, it is preset at the beginning position of the score. After that the score corresponding to the beginning position of playing, i.e., the set position of the song pointer, is displayed (n2). Looking at the displayed score, the player starts to play a musical instrument. The note data according to the playing are received through the MIDI interface 16 (n3), the data being stored in to the buffer (n4). Then, whether the written data into the buffer accords with the score data which the song pointer specifies is judged (n5). If "yes", the song pointer is incremented (n6), and therefore, if the finish of all the playing of one line (one step) is judged, a new score is displayed on the same step area (n9). Since the next line of the score has already been displayed on the other step area, the score two lines after is displayed. When the music is finished, the process is ended by judgment of n8.

While, if the inputted data through the MIDI interface 16 doesn't accord with the score data specified by the song pointer, several note data are received and accumulated in succession, and then the present playing position is inferred based on these playing data (n10). The inferring algorithm is explained later. The song pointer is moved to the inferred playing position (n11), the data of the buffer are rewritten with the inferred data (n12). This is because the data is used to refer to at the later judgment step. When the discord of the inputted data through the MIDI interface 16 and the score data is considerable, the data of the VRAM (display area) are changed so as to dissolve the discord (n13), and the process returns to n3.

The above mentioned inferring manner of the playing position is described as follows.

(1) First, the accord data of the playing data accumulated in the buffer and the score data to have already been played at the beginning position of any bar is retrieved retroactively from the presently specified position by comparing the two data. For example, if these data don't accord on the way of the second bar in FIG. 2 (A), the note found out first by retrieving is the note of note number 76 that is located at the beginning of the second bar.

(2) Several note pieces (about ten pieces) are extracted from the accord note to compare, and pairs of notes between the two note data series are made so that the two note data series accord fully. The pairs of note thus made are shown in FIGS. 4(A), (B). The number of the extracted note data is compared with the number of the made pairs. If the ratio of the numbers is a specified value (about 80% may be appropriate) or more, the cause of the discord is judged as a simple miss touch, so that the discord playing data is replaced with a right note data, and the process is continued.

(3) If the ratio of the above numbers is less than the specified value, the cause of the discord is judged as that the player has skipped the score with his own intention. In that case, several note data from the note data which doesn't accord are compared with the score data, the part of the data that the accord ratio of the compared data is more than the specified value is retrieved, and the song pointer is moved to the part. It is possible that the retrieval direction is forward from the position that the song pointer is located, or is backward therefrom. The forward retrieving is useful for the player who often plays skip playing, the backward retrieving being useful for the player who often plays replaying (over again). When the according position is found by the retrieving manner, the song pointer is moved to the accord position, and the data of the buffer is rewritten. If the song pointer position moves largely, the display contents are changed appropriately.

Regarding the playing position inferring in case of the discord, another manner can be applied. Also, the timing data and the note length data together with the tone pitch data can be used for retrieving in the case that the score is played correctly.

According to the embodiment of the present invention, if the displayed score is not accord with the actual playing, the playing position in the score is automatically retireved, and the displaying scores are controlled. Therefore, even in any miss touch playing, skip playing or replaying (playing over again), the correct playing position in the score can be tracked and the correct score can be displayed.

What is claimed is:

1. A music score display device comprising:
   storage means for storing music score data;
   display means for displaying the music score data for each of specified display sections;
   input means for inputting musical playing data including at least tone pitch data, the musical playing data comprising manual performance data;
   comparison means for comparing the musical playing data inputted from the input means with the music score data;
   determining means for determining a playing position according to the compared result of the comparison means; and
   display control means for controlling a display section of the display means based on the determined playing position from the determining means.

2. A music score display device according to claim 1, wherein said comparison means compares a specified number of data of said musical playing data and said music score data.

3. A music score display device according to claim 2, wherein said specified number of data are extracted from an accord position of said musical playing data and said music score data, and said search means detects a ratio of the specified number of data and a number of data of the accord position, and detects said playing position according to the ratio.

4. A music store display device according to claim 1, wherein said score data includes tone pitch data, and said comparison means compares the tone pitch data of the playing data with the tone pitch data of the score data.

5. A music score display device according to claim 1, wherein said determining means determines the playing position at which an accordance ratio of the compared result is larger than a predetermined value.

6. A music score display device according to claim 1, wherein said determining means includes second storage means for storing the playing data and means for comparing the stored playing data with the score data.

7. A music score display device according to claim 1, wherein said display means displays a plurality of the specified display sections of the score data.

8. A music score display device according to claim 1, wherein said display control means controls a display section of the display means so that new score data is displayed on the display means after playing of displayed score data is finished.

9. A music score display device according to claim 1, further comprising designation means for designating a display-starting position on the score data.

10. A music score display device according to claim 1, wherein said input means is operated by a player, and said search means detects an error in operation of the input means by the player according to the retrieved playing position.

11. An electronic musical instrument having a music score display function comprising:
- storage means for storing music score data;
- display means for displaying the music score data for each of specified display sections;
- input means for inputting musical playing data including at least tone pitch data, the musical playing data comprising manual performance data;
- musical instrument means, played by a player, for outputting the musical playing data;
- comparison means for comparing the musical playing data inputted from the input means with the music score data;
- determining means for determining a playing position according to the compared result of the comparison means; and
- display control means for controlling a display section of the display means based on the determined playing position from the determining means.

12. An electronic musical instrument according to claim 11, wherein said storage means is externally attachable.

13. A music store display device comprising:
- input means for inputting playing data comprising manual performance data;
- storage means for storing musical playing data;
- display means for displaying musical playing data for each of specified display section;
- comparing means for comparing the displayed musical playing data and the inputted playing data to determine correspondence therebetween; and
- control means for determining a section of the stored musical playing data corresponding to the inputted playing data and controlling the section of the store musical data corresponding to the inputted playing data.

* * * * *